March 12, 1968  G. J. CROWDES  3,372,564

METHOD FOR SHAPING METAL TUBES

Filed April 19, 1965

INVENTOR
GEORGE J. CROWDES

BY McLean, Morton & Boustead
ATTORNEYS

United States Patent Office 3,372,564
Patented Mar. 12, 1968

3,372,564
METHOD FOR SHAPING METAL TUBES
George J. Crowdes, West Dennis, Mass., assignor to Simplex Wire and Cable Company, Cambridge, Mass., a corporation of Massachusetts
Filed Apr. 19, 1965, Ser. No. 448,987
5 Claims. (Cl. 72—56)

ABSTRACT OF THE DISCLOSURE

A method for shaping a metal tube by means of forces created by magnetic flux is shown. A tube is passed continuously through a zone defined by an annular, electrically conductive coil of a material having high magnetic permeability and periodic surges of electrical current are passed through the coil to create a force on the moving tube to corrugate or swage it. By shaping the coil it is possible to produce a like shape in the moving tube and by synchronizing the rate of travel of the tube with the periodic surges of electrical current a regular corrugation can be produced in the tube.

---

Figure 1:
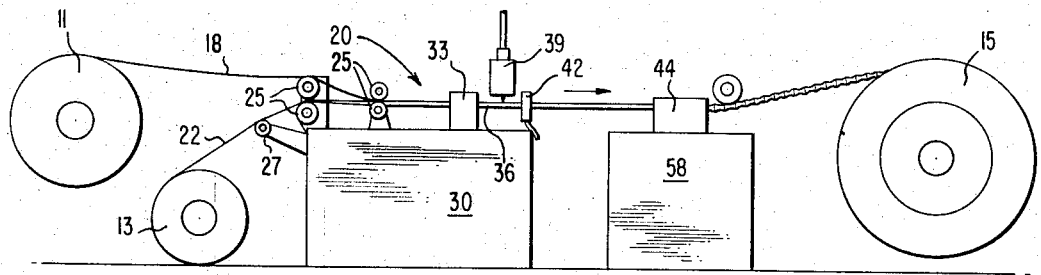

This invention relates to the production of shaped tubing and is particularly concerned with the production of sheathed cable. The method is applicable to the production of shaped tubing made from an electrically conductive metal by any one of a number of known processes; for example, the method is applicable to the production of welded and shaped tubes, such as corrugated tubes, made from continuous metal tapes which have been longitudinally welded and then are swaged to shape them.

The advantages of corrugated tubing, particularly its flexibility, are well-recognized. In particular, tubular corrugated sheathing for electric cable, made of copper, aluminum, steel and other metals and alloys is of widespread use. One recognized technique for such manufacture of such cable is outlined in Lehnert Patent 3,023,-300. In this procedure, electric cable having transversely corrugated tubular metallic sheathing is prepared by bringing strip material of the metal to be employed as a sheath adjacent to an electric conductor assembly which is to form the core of the cable. The strip material and core are then passed simultaneously lengthwise and parallel to each other continuously along a path, in sequence, through a tube-forming position, a tube-gripping position and a tube-corrugating position. In the tube-forming position, the strip material is folded about the cable core axially to form a tubular shape in which the longitudinal edges of the strip material are adjacent to each other and define a lengthwise split in the tube thus formed. Also in the tube-forming operation the longitudinal split is sealed, for example, by arc welding, to form a longitudinal seam on the tube.

The sealed tube containing the core is then passed through a gripping position in which a "puller" grasps the tube to prevent any rotation of the tube about its axis and simultaneously "pulls" the tube to pass it on to the final corrugating position in which lateral corrugations, which can be either helical or circular, are imparted to the tube to form it into corrugated tubing. The valleys of the corrugations thus formed are usually firmly pressed against the core.

A mechanical corrugating device such as shown in Penrose Patent 2,817,363 is employed in such prior corrugating methods. In the Penrose device the corrugations are imparted helically by rotating several canted rollers about the surface of the tubing, the rollers being radially displaced from the axis of the tubing an appropriate distance to impart the desired depth of corrugations. Prior methods of forming coreless tubing also often follow similar techniques, except that the tube-forming step usually takes place about a stationary core or mandrel.

Such prior mechanical methods for corrugating tubes, including tubular sheathed cable, have a number of inherent disadvantages when the tube-forming and corrugating steps are performed in tandem on a single manufacturing line. For one, the corrugating step generally cannot be performed as quickly as the welding, thereby limiting the manufacturing speed. Also, a serious deterrent is posed to tandem operation because special precautions are required to prevent the torque applied to the sheathed cable in the corrugating step from being transmitted back to the welding stage, which would cause an uneven or otherwise faulty seam.

In this invention, corrugations or other desired shapes are produced by magnetic swaging substantially without application of torque or other unbalanced lateral or axial force to the sheathed cable or other tubular product. The swaging method permits much greater corrugating or other shaping speeds than heretofore have been considered possible. Such speeds permit faster and more advanced techniques to be employed in other tube-forming steps performed in tandem with tube-shaping. For example, in the case of sheathed cable manufacture, the greater speed and freedom from significant torque in the corrugating (swaging) step allows plasma welding techniques to be used in the tube-forming step in place of conventional and slower arc welding. See copending Crowdes application Ser. No. 448,981, filed of even date herewith and incorporated herein by reference.

Although this invention was developed for the specialized application of forming transversely corrugated tubing, i.e., tubing having either helical or circular corrugations, it will be apparent that this invention is applicable to the production of tubing having any shape which can be imparted by swaging. Thus this invention is applicable to the production of tubing having particular cross-sectional shapes, such as square or the like, and to the production of tubing which is swaged down to smaller transverse dimensions.

In magnetic swaging, an electrically conductive material is deformed by electromagnetic means. It is known that when an electric conductor is held in a rapidly changing magnetic field, eddy currents are induced in the conductor which generate forces tending to move the conductor. If the conductor is prevented from movement in the direction of the magnetically generated forces, the forces, of course, tend to deform the conductor. By shaping the magnetic field such that its intensity varies along or about the conductor, the conductor can be shaped in accordance with the intensity variation. This phenomenon is employed for metal-forming in the method and apparatus described in U.S. Patent 2,976,907. In the patent, a magnetic coil is used momentarily to set up a predetermined, shaped, magnetic field and a metal workpiece, held within the magnetic field, is thereby deformed.

This invention is based upon the discovery that the metal workpiece need not be held stationary within the coil during forming but can be drawn through the coil while making major variations in the current passing through the coil. In the magnetic swaging method of this invention a rapid pulse of high current is passed through a coil to create magnetic flux which forms a circumferential groove about a tube as the tube is drawn through the coil. The electric current in the coil is discontinued, allowing the next portion of the tube to pass through as a land, and then a pulse of current is once more passed through the coil to form another groove about a succeeding portion of the tube. It is possible, by the use of a magnetically permeable core associated with the coil through which core the tube passes, to form a plurality of lands and grooves simultaneously on the tube, if the core is shaped to provide alternating maxima and minima in flux density along the path through which the tube is drawn. Consequently, a series of corrugations can be formed with each current pulse in the coil, thus, in some cases, allowing an even greater speed through the coil. Other permeable core shapes can be used to provide other shapes to the tube. If desired the magnetic swaging can be used simply to swage the tube inwardly about a core.

The current pulses through the coil can be obtained by rapid condenser discharge, and to provide for rapidity in the pulses consistent with condenser charge rates, a plurality of condensers can be operably associated with the coil, so that they can be discharged in sequence to give a succession of pulses through the coil more rapidly than might otherwise be obtained. The rapidity of the condenser discharge and the consequent rapidity of the magnetic impulse, it has been discovered, can serve to overcome the effect of movement of the tube or cable sheath through the magnetic field. Electric circuitry is also provided so that one or more of the condensers, usually arranged in parallel, will be charging while another is discharging.

Figure 2:
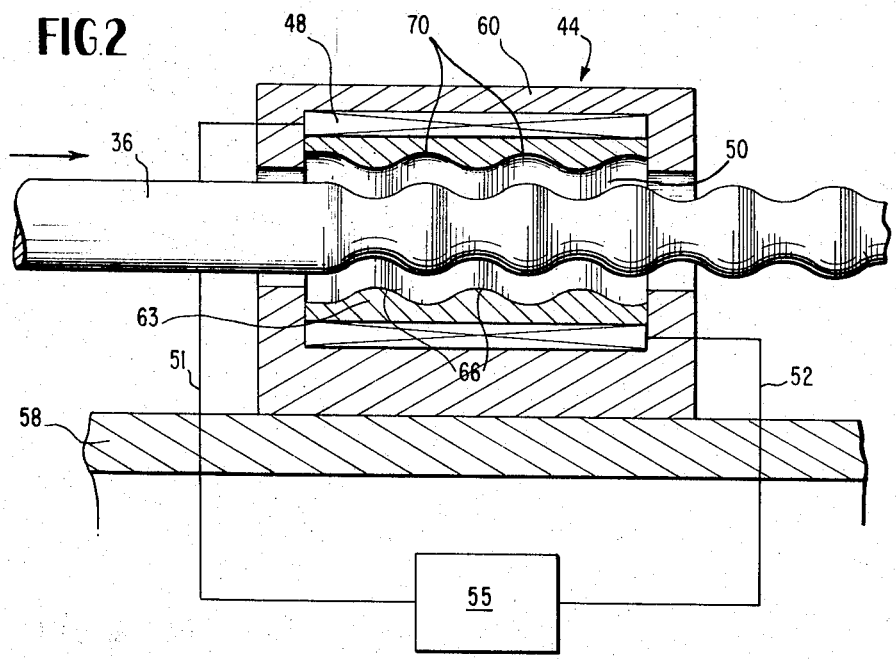

The invention will be better understood from a consideration of the accompanying drawing which should be considered illustrative only and not limiting. In the drawing:

FIGURE 1 is a schematic representation of an assembly line which can be used in this invention, and FIGURE 2 is an enlarged view, partly in cross-section of a magnetic swaging device.

In the drawings, cable core payoff reel 11 and tape payoff reel 13 are synchronized with the sheathed cable takeup reel 15 which is driven to pull core 18 and tape 22 through a tube-forming operation and tube-corrugating operation arranged in tandem. Payoff reel 11 feeds cable-core 18 to the tube-forming station indicated generally as 20. Metal tape 22 from the payoff reel 13 is also fed to tube-forming station 20. Station 20 generally includes a series of rolls 25 (only two pairs of which are shown) shaped to produce a longitudinal curvature in the tape 22. Additional support tape rolls 27 can also be provided. These and other elements of the tube-forming station conveniently rest on a support base 30.

The final shaping of the tape to tubular form can be performed by the use of squeeze-blocks 33 which can be, for example, a pair of concave-surfaced carbon blocks, as disclosed in copending Wakefield application Ser. No. 397,216, filed Sept. 17, 1964, incorporated herein by reference. Squeeze-blocks 33 serve to bring the opposite edges of the tape into an abutting relationship, ready for welding. The formed tube, designated 36 in the drawings, is drawn by reel 15 past welding torch 39, which preferably is a plasma torch, as mentioned, to weld the abutting edges of the tube thereby closing the tube and forming a seam. When such a torch is used to weld the seam of the tube a quenching means 42, such as water spray, also can be provided.

The formed tube is then passed to the magnetic swaging device indicated generally as 44. This device includes an electrically conductive annular coil 48 which is connected by electrical leads 51 and 52 to a pulsed, direct current power supply 55 which conveniently can be located within a base member 58 on which coil 48 is mounted. Power supply 55 includes a series of condensers arranged for sequential connection through the coil 48 and for connection to high potential direct current to permit recharging when disconnected from coil 48. Thus, periodic pulses of direct current pass through coil 48.

Coil 48 can be relatively short, for example, the length of one corrugation in the finished tube, and thereby one corrugation is produced with each electrical discharge through the coil. As illustrated, however, it is preferred to use a coil having the elongated configuration shown in FIGURE 2. Coil 48, as illustrated, is conveniently enclosed in a casing 60 having open ends to permit tubing 36 to be drawn through the open center 50 of coil 48. In its center 50, coil 48 is provided with a sleeve-like interior pattern core, i.e., "die" 63. Core 63 is a rigid member, fixedly positioned within coil 48 made of a material of high magnetic permeability, such as soft iron, and is internally corrugated to shape the magnetic flux created by passage of the high momentary current through coil 48 by bringing a stronger flux density nearer to the center of space 50 at the hills 66 of core 63 than at the valleys 70.

The rate at which the direct current pulses are passed through coil 48 is synchronized with linear speed of tubing 36 as it passes through space 50. Thus, the frequency of current pulses through the coil is determined in relation to the time needed for a formed section of corrugated tubing to move out of the passage 50 and be replaced by an unformed section. The time constant of the discharge circuit of each condenser in supply 55, as such condenser is in turn connected to coil 48, should be small. At speeds of tubing 36 on the order of 100 feet per minute with twelve corrugations formed per foot, a discharge circuit time constant on the order of 5 milliseconds or less is appropriate.

As an example of a preferred manufacturing procedure according to this invention, a cable core about ⅞ inch in diameter, consisting of an electrically-conductive wire core surrounded by suitable insulation, is continually paid off from a reel at about 100 feet per minute in synchronization with Grade 1060 aluminum tape from another reel. The tape is about 2¾ inches wide and about 25 mils thick. The core and the tape are brought into contact with each other and pass through a forming section and a welding section, as described above, to produce a tubular sheath from the tape having a longitudinal, welded seam and to enclose the insulated conductor in the tubular sheath. The sheathed conductor is then passed through the center of a coil having positioned therein a sleeve-like, pattern core through which the sheathed conductor also passes. The coil is made up of a suitable number of turns to provide the required magnetic field when approximately 5,000 joules of energy are discharged through it from condensers charged to approximately 7 kilovolts. Obviously the coil design and charging voltages of the condensers can be adjusted to provide the required amount of energy for the particular cable sheath to be formed. The length of the coil is 6 inches and the sleeve, i.e., pattern core, also is 6 inches in length. Interiorly, the sleeve is provided with multiple circular corrugations which are spaced along the length of the sleeve with the maximum and minimum inside diameters of the sleeve being 1 inch and ⅞ inch, respectively.

As the sheathed conductor is drawn through the coil and sleeve, the coil is connected to a source of high potential direct current, i.e., a condenser bank charged to a potential of 7 kilovolts, at a rate of three to four times per second, such that circular corrugations are imparted to the tubular sheath on each discharge of current from the condenser bank through the coil. It will be appreciated that the corrugations formed in the sheath are spaced apart corresponding to the corrugations in the pattern core and that the rate at which the coil is connected to a condenser bank is synchronized with the rate at which the sheathed conductor is drawn through the coil.

It is claimed:

1. A method for shaping a metal tube and providing said tube with regularly varying cross section along its length which comprises continuously feeding said metal tube through a magnetic swaging device having an annular electrically conductive coil, passing through said coil periodically momentary surges of electric current in synchronization with the feed rate of travel of said tube thereby creating a shaped magnetic flux of intensity sufficient to swage inwardly the moving tube and recovering a shaped tube having a regularly varying cross section along its length.

2. The method of claim 1 in which said magnetic swaging device includes a shaped core made of a metal having high magnetic permeability to shape said magnetic flux and thereby correspondingly shape said tube.

3. The method of claim 1 in which the tube is a sheath around an insulated cable.

4. The method of claim 1 in which a plurality of corrugations are formed simultaneously.

5. The method of claim 2 wherein the shaped core is to effect corrugating.

References Cited

UNITED STATES PATENTS

| | | | |
|---|---|---|---|
| 2,976,907 | 3/1961 | Harvey et al. | 72—56 |
| 3,203,211 | 8/1965 | Mallinckrodt | 72—56 |
| 3,212,311 | 10/1965 | Inoue | 72—56 |
| 3,253,443 | 5/1966 | Malmberg | 72—56 |
| 3,256,846 | 6/1966 | Keinanen | 72—56 |
| 3,286,497 | 11/1966 | Cary | 72—56 |
| 3,288,006 | 11/1966 | Erlandson | 72—56 |

RICHARD J. HERBST, *Primary Examiner.*